United States Patent [19]
Kurose

[11] Patent Number: 4,953,230
[45] Date of Patent: Aug. 28, 1990

[54] DOCUMENT IMAGE PROCESSING SYSTEM
[75] Inventor: Morisumi Kurose, Yokohama, Japan
[73] Assignee: Ricoh Company, Ltd., Tokyo, Japan
[21] Appl. No.: 396,828
[22] Filed: Aug. 21, 1989

Related U.S. Application Data

[63] Continuation of Ser. No. 150,501, Feb. 1, 1988, abandoned, which is a continuation of Ser. No. 858,536, Apr. 29, 1986, abandoned, which is a continuation of Ser. No. 464,763, Feb. 7, 1983, abandoned.

[30] Foreign Application Priority Data

Feb. 5, 1982 [JP] Japan .................................. 57-17250

[51] Int. Cl.$^5$ .............................................. G06K 4/32
[52] U.S. Cl. .......................................... 382/46; 382/9; 382/18; 371/1; 358/496; 358/488; 358/464
[58] Field of Search .......................... 382/9, 18, 44–46, 382/48, 61; 371/1; 358/448, 464, 443, 483, 486, 488, 496

[56] References Cited

U.S. PATENT DOCUMENTS

| | | | |
|---|---|---|---|
| 3,231,860 | 1/1966 | Chatten .................................. | 382/45 |
| 3,234,511 | 2/1966 | Brust et al. ............................. | 382/45 |
| 3,865,482 | 2/1975 | Bendall et al. ............. | 355/3 DD X |
| 3,872,433 | 3/1975 | Holmes et al. ..................... | 382/45 X |
| 3,878,509 | 4/1975 | Kikuchi et al. .................... | 382/45 X |
| 3,982,832 | 9/1976 | Bendall et al. ........................... | 355/8 |
| 4,316,667 | 2/1982 | Edwards et al. ................. | 355/3 SH |
| 4,370,641 | 1/1983 | Kantor et al. ................... | 250/578 X |
| 4,373,185 | 2/1983 | Mills et al. .......................... | 364/478 |
| 4,424,535 | 2/1984 | Rothbart et al. ............... | 358/293 X |
| 4,558,461 | 12/1985 | Schlang ............................ | 382/46 X |

FOREIGN PATENT DOCUMENTS

| | | | |
|---|---|---|---|
| 55-80186 | 6/1980 | Japan ..................................... | 382/46 |
| 55-83971 | 6/1980 | Japan ..................................... | 382/46 |

OTHER PUBLICATIONS

*IBM Technical Disclosure Bulletin*, vol. 21, No. 9, Feb., 1979, Bishop et al., "Character Recognition Approach Involving Histogram Classification", pp. 3461–3467.

Primary Examiner—Leo H. Boudreau
Assistant Examiner—Michael Razavi
Attorney, Agent, or Firm—Oblon, Spivak, McClelland, Maier & Neustadt

[57] ABSTRACT

A document image processing system for correcting the skew of an optically read document image includes a scanner including a first plurality of pixels which are operationally divided into a second plurality of blocks, a second plurality of detecting sections each comprised of a decoder and a pair of latches and each corresponding to one of said second plurality of blocks, a pixel counter for counting the pixel number in the main scanning direction, a line counter for counting the line number of scanning lines, a circuit for determining the skew amount and its direction, a memory for storing the document image information and write/read controller for writing data in or reading data out of the memory.

7 Claims, 2 Drawing Sheets

DOCUMENT IMAGE PROCESSING SYSTEM

This application is a continuation of Ser. No. 150,501, filed on 02/02/88, now abandoned, which is a continuation of Ser. No. 858,536, filed Apr. 29, 1986, now abandoned, which is a continuation of Ser. No. 464,763, filed Feb. 7, 1983, now abandoned.

BACKGROUND OF THE INVENTION

1. Field of the Invention

This invention relates to a system for processing the image information of a document after obtaining the information by optically reading the document, and, in particular, to a document image processing system for correcting the skewness of a document image obtained by reading a document to be processed.

2. Description of the Prior Art

In document image processing systems which are used in various machines such as optical character reading machines, facsimile machines, digital copying machines and the like, it is common practice to correct the skewness of a document image which is obtained by optically reading a document to be processed prior to subjecting the document image to desired processing steps. In prior art document image processing systems, use has been typically made of a pair of skew detecting marks provided on both sides of the top end portion of a document to be processed, and the amount of skew has been determined by detecting the relative positional difference between the pair of skew detecting marks in the auxiliary scanning direction, or the feeding direction of the document to be read, so as to carry out the skew correction of the document image. Such prior art systems, however, are disadvantageous because they are useless for documents without required skew detecting marks. Moreover, since the amount of skew determined by such prior art systems indicates the amount of skew of the document itself and not of the document image of the document, the skew correction tends to be unsatisfactory.

SUMMARY OF THE INVENTION

The above-described disadvantages of the prior art are overcome with the present invention and an improved system for processing the document image obtained by optically reading a document to be processed is provided. In accordance with one aspect of the present invention, there is provided a system for processing a document image which is obtained by optically reading a document to be processed, comprising: scanning means for scanning the document to be processed in a first direction while causing a relative motion in a second direction, which is perpendicular to said first direction, between said scanning means and said document at constant speed, thereby obtaining document image data of said document; means for storing said document image data; detecting means for detecting the end positions of a character line of said document from said document image data; determing means for determining the amount of skew of said document image using the detected end positions of a character line of said document; and correcting means for correcting the skewness of said document image in accordance with the amount of skew thus determined by said determining means.

Accordingly, it is a primary object of the present invention to provide an improved document image processing system.

Another object of the present invention is to provide a document image processing system capable of correcting the skewness of the image on a document without requiring the provision of skew detecting markers on the document.

A further object of the present invention is to provide a system for correcting the skewness of a document image at high accuracy.

A still further object of the present invention is to provide an image skew correcting system which may be easily applied to optical readers, facsimile machines, digital copiers and the like.

Other objects, advantages and novel features of the present invention will become apparent from the following detailed description of the invention when considered in conjunction with the accompanying drawings.

DESCRIPTION OF THE PREFERRED EMBODIMENTS

Figure 1:
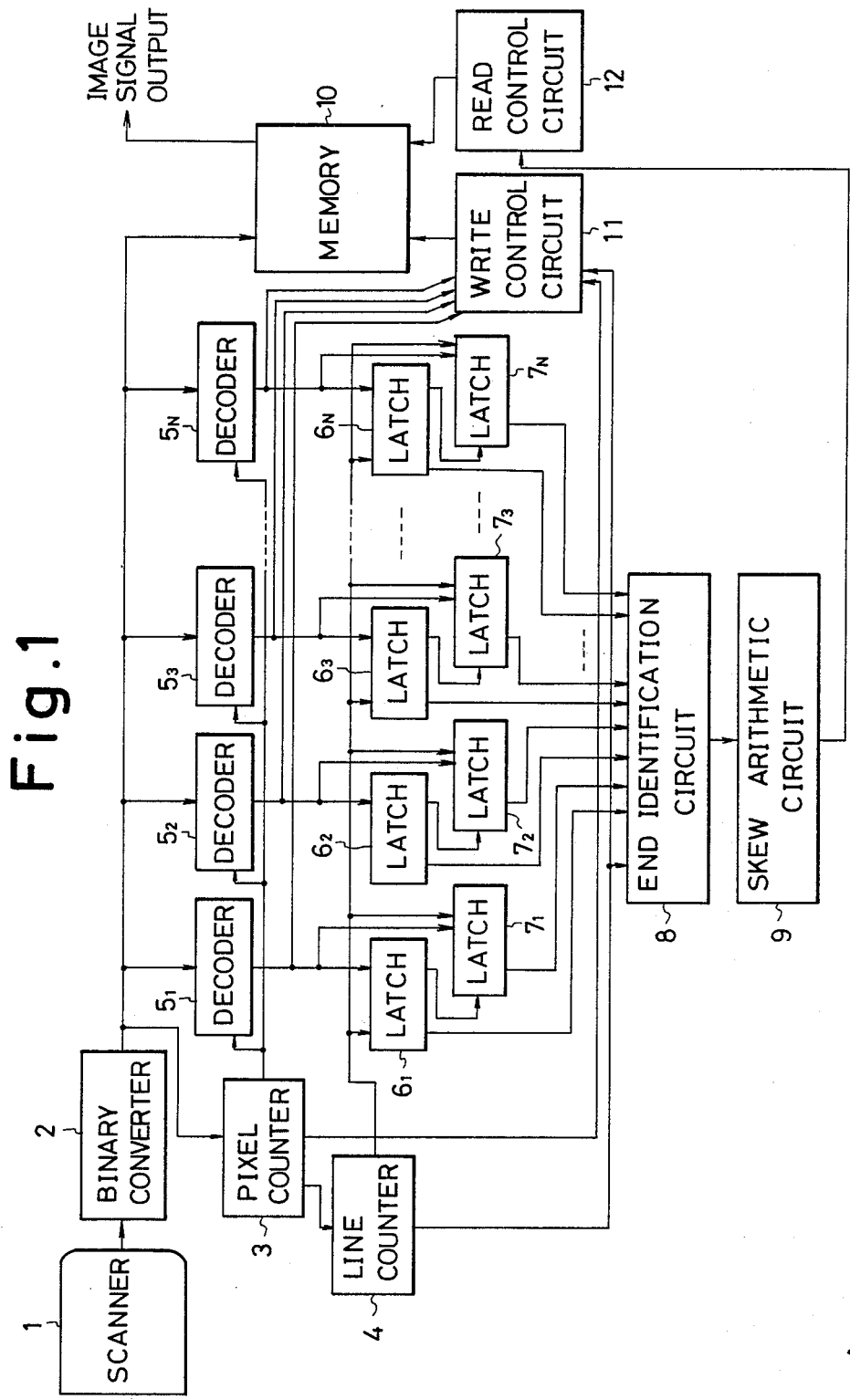
FIG. 1 is a block diagram showing a document image processing system constructed in accordance with one embodiment of the present invention.

Referring now to FIG.1, there is shown a document image processing system for correcting the skewness of the document image constructed in accordance with one embodiment of the present invention. As shown, the system includes an image scanner 1 for scanning a document to be processed not shown along the so-called main scanning direction, or the longitudinal direction of a single array of photoelectric elements each forming a pixel, to optically read the document image of the document, thereby producing a document image analog signal. The system also includes a binary converter 2 for receiving the document image analog signal from the scanner 1 and converting it into document image digital data by processing the analog signal with a predetermined threshold level. The document image digital data thus have only two values, i.e., high and low or black and white.

Also provided is a pixel counter 3 which is connected to receive the document image digital data from the binary converter 2, and a line counter 4 is provided to receive a signal from the pixel counter 3, as shown. It is to be noted that the binary counter 2 supplies transfer clock pulses each corresponding to one pixel of the document image. Thus, the pixel counter 3 counts in response to the transfer clock pulses, and when its count reaches a predetermined value corresponding to the end of each main scanning line, or the last photoelectric element of the scanner 1, it supplies a carry signal as its output and it thereafter is reset automatically. For example, if the scanner 1 is comprised of a Charge Coupled Device (CCD) having the density of 8 pixels or photoelectric elements/mm along the main scanning line, then, in order to scan a document of A4 size across its width, the required number of pixels is 1,728, and thus a counter of modulo-1728 is used as the pixel counter 3. On the other hand, the line counter 4 increases its count in response to a carry signal from the pixel counter 3 so that its count indicates the number of the scanning line which is being scanned. Accordingly, the count of the pixel counter 3 indicates the position (pixel number along the scanning line) of the pixel which has just been read along the main scanning line.

Figure 2:
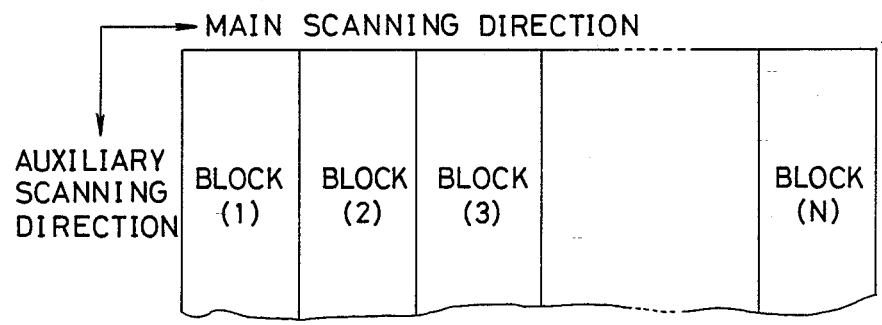
FIG. 2 is a schematic illustration which is useful for understanding the scanning operation of the system of FIG. 1.

A plurality of decoders $5_1, 5_2, \ldots, 5_N$ are provided as individually connected to the binary converter 2 so that the document image signal is supplied to the decoders $5_1-5_N$ after having been converted into the binary format. A plurality of latches $6_1, 6_2, \ldots, 6_N$ and like plurality of latches $7_1, 7_2, \ldots, 7_N$ are provided as connected to the corresponding decoders $5_1-5_N$ and the line counter 4. It is to be noted that the scanning width or longitudinal length of the scanner 1 is divided into N number of blocks for the purpose of document image processing operation. That is, as shown in FIG. 2, the entire scanning length traversed by the scanner 1 is divided into N number of blocks along the main scanning direction, or the direction along which a plurality of photoelectric elements are arrange in the form of a single array. The main scanning direction is perpendicular to the auxiliary scanning direction which is the direction of relative motion between the scanner 1 and a document to be read. Thus, in the case where the scanner 1 is provided fixed in space, then the document to be read is moved in the auxiliary scanning direction with respect to the scanner 1.

If there are 1,728 pixels in the scanning line, it is so divided that each block has pixels of 85 to 90. As may be noticed already, each of the decoders $5_1-5_N$ and latches $6_1-6_N$ and $7_1-7_N$ corresponds to one of the blocks so divided. As will be fully described later, the number of the first scanning line (count of counter 4) of the first character line or row of a document image in each block is latched into the corresponding one of the latches $6_1-6_N$, and the number of the last scanning line of its character line is latched into the corresponding one of the latches $7_1-7_N$. The decoders $5_1 5_N$ function to detect these first and last scanning lines in each block.

Also provided is an end identification circuit 8 which is connected to receive signals from the line counter 4 as well as from each of the latches $6_1-6_N$ and $7_1-7_N$, and the circuit 8 functions to detect the positions of both ends of the first character line or row in the document image obtained by scanning the document to be processed on the basis of the data supplied from the latches. A skew arithmetic circuit 9 is provided to receive information as to the detected end positions of the first character line from the end identification circuit 8, and the circuit 9 carries out a predetermined arithmetic operation on the basis of the end position information supplied from the circuit 8 to produce the amount of skew of the document image. Furthermore, a memory 10 is provided for storing the document image data obtained by optically reading the document to be processed, and write and read control circuits 11 and 12 are provided as connected to control the operation of writing data in or reading data from the memory 10, the detailed operations of which will be fully described later.

The general process for detecting the amount of skew of a document image and correcting the skewness of the document image in accordance with the present document image processing system will now be described. When a document to be processed is fed, the scanner 1 starts to scan the document along its first main scanning line, whereby each of the pixels in the scanning line is examined and thus the first appearing "black" pixel is detected. This detecting operation for the first appearing black pixel is carried out for the entire scanning line from the scanning start point (left end) to the scanning end point (right end). Assuming that the first black pixel has been found in the 1th number scanning line in block L, then the operation is carried out to find whether or not more black pixels are present in each of the scanning lines following the 1th number scanning line in sequence in block 1.. As a result, if it is detected that black pixels are present in W(L) number of scanning lines following the 1th number scanning line, in which the first appearing black pixel has been detected, and no black pixel is present in the scanning line following the W(L)th number of scanning line counted from the 1th number of scanning line, then the value of W(L) is stored in the memory as the width of a character line or row of the first character line in block L.

Then, it is detected whether or not the thus found character line continues to the blocks contiguous to block L in the main scanning direction. In this case, the detection may be carried out from either side, i.e., block L+1 which is contiguous to the right of block L or block L−1 which is contiguous to the left of block L. However, in the present embodiment, it is assumed that the detection proceeds to block L+1 which is contiguous to the right of block L.

Accordingly, the detecting operation is carried out to find whether or not black pixels are present in each of W(L)+m number of scanning lines following 1th number scanning line in block L+1. If no black pixels have been found at all as a result of the detecting operation, it is determined that the right-hand end of the character line exists in block L. On the other hand, if black pixels have been found in at least some of the W(L)+m number of detected scanning lines, it is determined that the character line extends into block L+1 continuously from block L. And then the information as to the scanning line 1th+1 having first appearing black pixels and the number of scanning lines W(L+1) having black pixels following 1th+1 scanning line is stored in the memory. Then the detection proceeds to the next following block L+2 and the detection is carried out in a similar manner to see whether the character line further extends into this block continuously. In this case, however, the detection is carried out for the W(I.+1)+m number of scanning lines starting from the 1th+1 scanning line. In this manner, the region of detection is suitably determined for each block. Similarly as above, the detection operation is carried out for those blocks located to the left of block L from one block after another until the left-hand end of the character line has been found.

After having found that the left-hand and right-hand ends of the character line are located in blocks Q and R, the amount of skew T is calculated in accordance with the following equation.

$$T = (2q + W(Q) - (2r + W(R)))/(2(Q-R)) \tag{1}$$

where,
q = line number of the scanning line having first appearing black pixels in block Q (i.e., line number of the first scanning line of the first character line in block Q),
W(0) = width of the character line (i.e., number of scanning lines) in block Q,
r = line number of the first scanning line of the character line in block R,
W(R) = width of the character line in block R, Q=block number of block Q, and
R=block number of block R.

It is to be noted that the value T obtained from equation (1) indicates the amount of skew for each block.

In accordance with the present invention, the skew correction is carried out by shifting each of the blocks of the document image information in the auxiliary scanning direction in accordance with the amount of skew T calculated for each of the blocks. In other words, in the case where the character line is skewed to go up toward right (i.e., q is larger than r), if the rightmost block N of the document image is to be used as a reference, the skew correction is carried out by shifting block N-1, which is contiguous to the left of block N, upward by T number of scanning lines, block N-2 by 2T number of scanning lines, block N-3 by 3T number of scanning lines, and so on. In the case of opposite skew direction, using the leftmost block 1 as a reference, the skew correction is carried out by shifting block 2 upward by T number of scanning lines, by shifting block 3 upward by 2T number of scanning lines, and so on. The skew correction may also be carried out by reversing the direction of block shifting while using block N as a reference.

Now, the operation of the embodiment of the present document image processing system shown in FIG.1 will be described. When the scanner 1 starts to scan a document to be processed, the pixel and line counters 3 and 4 start to count in association with the scanning operation of the scanner 1. As is obvious for those skilled in the art, the counters 3 and 4 are reset prior to the initiation of the scanning operation, so are the decoders $5_1-5_N$, the latches $6_1-6_N$ and $7_1-7_N$ and the write control circuit 11. The document image analog signal supplied from the scanner 1 is converted into document image digital data comprised of two states, high or low, by the binary converter 2. And the digital data are then stored into the memory 10 in sequence under the control of the write control circuit 11. During this write operation, the address for each of the document image digital data has two components: the count of the pixel counter 3 constituting one address component in the main scanning direction and the count of the line counter 4 constituting the other address component in the auxiliary scanning direction, and such an address is also supplied to the memory 10 through the write control circuit 11.

However, the write control circuit 11 functions to maintain the address in the auxiliary scanning direction to be "0" until any one of the decoders $5_1-5_N$ supplies the logic high or "1" as its output. Once the logic high or "1" state has been supplied as an output from any of the decoders $5_1-5_N$, the write control circuit 11 increments the address in the auxiliary scanning direction by 1 each time when the line counter 4 increases its count. In other words, scanning lines are skipped before any of the decoders $5_1-5_N$ supplies "1" as its output, and these skipped scanning lines are not stored into the memory 10. In the write control circuit 11 is provided a skipped line counter (not shown) for counting the number of scanning lines thus skipped. And, when any of the decoders $5_1-5_N$ has supplied "1" as its output, the value obtained by subtracting the count of the skipped line counter from the count of the line counter 4 is stored into the memory 10 as an address component in the auxiliary scanning direction.

The decoders $5_1-5_N$ are controlled by the output from the pixel counter 3, and they are rendered operative in sequence corresponding in timing with the associated blocks 1-N, so that that portion of the document image digital data from the binary converter 2 which corresponds to the associated block is allowed to pass through the corresponding decoder. Under the condition, when each of the decoders $5_1-5_N$ has detected the appearance of the first black pixel in its own block, it supplies "1" as its output. When one of the decoders $5_1-5_N$ supplies "1" as its output, the corresponding one of the latches $6_1-6_N$ functions to latch the current count of the line counter 4, and, at the same time, the state of the reset signal to the corresponding one of the latches $7_1-7_N$ is changed to "0" thereby removing the inhibit condition. Any of the decoders $5_1-5_N$ supplies "1" as its output when it has detected the presence of a scanning line having a black dot in the block to which it belongs; on the other hand, when any of the decoders has detected the presence of a scanning line having no black dot in its own block, it then supplies "0" as its output. With the reset condition of the latches $7_1-7_N$ removed by the associated latches $6_1-6_N$, if any of the decoders $5_1-5_N$ changes the state of its output from "1" to "0", the count currently existing in the line counter 4 is latched into the corresponding one of the latches $7_1-7_N$.

In this manner, the decoders $5_1-5_N$, and the latches $6_1-6_N$ and $7_1-7_N$ are so structured to function in unison for the same block and independently from the other blocks, and thus they detect the first and last scanning lines of a character line in respective blocks and have line numbers of thus detected first and last scanning lines stored in the memory. Under the circumstances, in some instances, there is a likelihood that the line number of first and/or last scanning line of the second or any of the subsequent character lines is erroneously detected and stored in some blocks. In order to avoid the occurrence of such an error, in the skew correcting process as described previously, the detection range for detecting the character line in the block contiguous to the block in which the character line has been detected is limited. On the other hand, in the present embodiment, such an error is prevented from occurring by using the end identification circuit 8 which determines whether or not the information latched in the latches $6_1-6_N$ and $7_1-7_N$ is concerned with the first character line.

Stated more in detail with respect to the function of the end identification circuit 8, after the line number of a scanning line has been latched into latch $7_i$ of block i, if no line number of a scanning line has been latched into the latch $7_{i+1}$ corresponding to the next block i+1 or the latch $7_{i-1}$ corresponding to the block i-1 on the other side (i.e., the latch $7_{i+1}$ or $7_{i+1}$ maintain the "0" state) within five consecutive scanning lines, it is determined that the first character line or row has been terminated. Then, under the circumstances, two latches $6_i$ and $6_j$, one of which has the largest line number with the other having the smallest line number other than zero, are detected, and the line number information contained in these latches $6_i$ and $6_j$, together with the information contained in their associated latches $7_i$ and $7_j$, as well as the block number information I and J are supplied to the skew arithmetic circuit 9.

Figure 3:
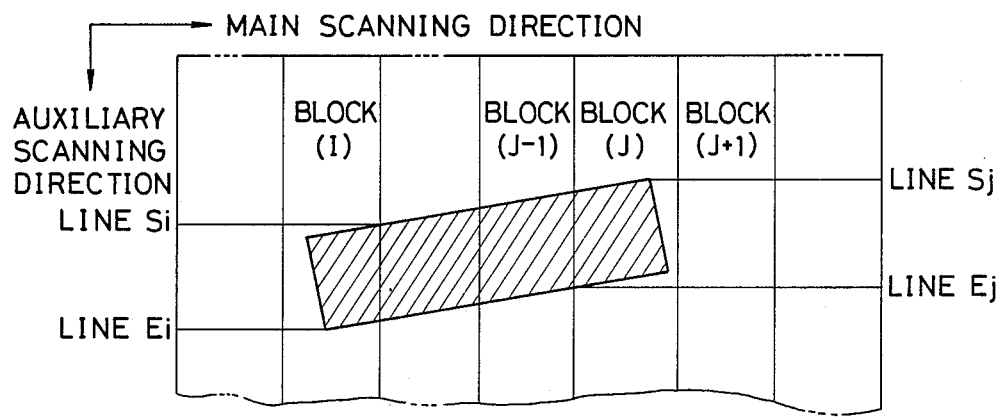
FIG. 3 is a schematic illustration showing how the ends of a first character line of document image are detected in accordance with the system of FIG. 1.

Described further in detail with particular reference to FIG. 3, if the document image as shown is optically read, the line numbers of the scanning lines $S_i$ and $E_i$ are latched into the latches $6_i$ and $7_i$, respectively, as the left end position information of the character line or row indicated by the shaded area, and, similarly, the line numbers of the scanning lines $S_j$ and $E_j$ are latched into the latches $6_j$ and $7_j$, respectively, as the right end position information of the character line. The information as to the line numbers contained in the latches $6_i$, $6_j$, $7_i$ and $7_j$ and the information as to the block numbers I and J are supplied to the skew arithmetic circuit 9 as position information of the scanned document image, or character line. In the case of the example shown in FIG. 3, the character line is skewed upward toward right. As is obvious, the scanning lines following the line $S_j$ are read into the memory 10 in sequence in the illustrated example.

The skew arithmetic circuit 9 receives the position information supplied from the end identification circuit 8 and after processing the position information in accordance with the equation (1) to calculate the skew amount T, which is then supplied to the read control circuit 12. Simultaneously therewith, the skew arithmetic circuit 9 also determines the skew direction, i.e., whether it is upward or downward toward right, on the basis of the received position information and applies a skew direction signal thus determined to the read control circuit 12. The skew direction may be determined from block numbers I and J such that it is upward toward right if I is larger than J and it is downward toward right if I is less than J, i.e., the line number latched in the latch $6_i$ being smaller than the line number latched in the latch $6_j$.

Upon completion of reading the entire page of the document, the document image information is read from the memory 10 in sequence in the order of increasing line numbers under the control of the read control circuit 12. In this case, the read control circuit 12 appropriately controls the alteration of address in the auxiliary scanning direction to be supplied to the memory 10 in accordance with the information as to skew amount T and skew direction supplied from the skew arithmetic circuit 9 in each of the blocks, thereby allowing to carry out the skew correction. As a result, there is obtained a document image, the skew of which is corrected from block to block, from the memory 10.

It is to be noted that those elements such as end identification circuit 8, skew arithmetic circuit 9, and write and read control circuits 11 and 12 may be implemented as a part of a microprocessor wholly or partly, as is obvious for those skilled in the art.

While the above provides a full and complete disclosure of the preferred embodiments of the present invention, various modifications, alternate constructions and equivalents may be employed without departing from the true spirit and scope of the invention. For example, it may be so structured to carry out such a skew correction in every character line or every predetermined number of character lines. Furthermore, a plurality of skew amounts obtained for a plurality of character lines may be averaged and such an averaged skew amount may be used as the final skew amount in the skew correcting step. The method for detecting the end positions of a character line and the method for calculating the amount of skew should not be limited to those described above, and various modifications manifest themselves for those skilled in the art without departing the scope of the present invention. Besides, once the skew has been detected it may be so structured that the skew correction for the already read document image is carried out while reading another document image. Therefore, the above description and illustration should not be construed as limiting the scope of the invention, which is defined by the appended claim.

What is claimed is:

1. A system for processing a document image which is obtained by optically reading a document including at least one character line to be processed, comprising:

scanning means provided fixed in space for scanning the document to be processed in a first direction while causing a relative motion in a second direction, which is perpendicular to said first direction, between said scanning means and said document at constant speed, thereby obtaining document image data of said document, said scanning means including a first plurality of photoelectric elements arranged in the form of a single array in said first direction;

means for storing said document image data;

detecting means including a plurality of blocks for detecting the end positions of a character line of said document with reference to a first reference line extending in said first direction and a second reference line extending in said second direction from said document image data;

determining means for determining the amount of skew of said document image using the detected end positions of character line of said document; and correcting means for correcting the skew of said document image by shifting said document image data in said second direction on a block by block basis without rotation in accordance with the amount of skew thus determined by said determining means;

wherein said skew is an angular displacement of the character line relative to the first and second scanning directions and said detecting means in connected between said scanning means and said determining means and said skew is corrected by shifting each of blocks of image data which lags behind a leading left-most or right-most block of image data forwardly in said second direction proportionately over a corresponding amount depending on a distance between each of said blocks of image data and said leading left-most or right-most block of image data.

2. A system of claim 1 wherein said determining means also determines the direction of the skew of said document image, and said correcting means corrects the skew of said document image also in accordance with the thus determined skew direction.

3. A system of claim 2 wherein said scanning means further includes a pair of first and second counters, the count of said first counter indicating the position expressed in terms of pixel number and the count of said second counter indicating the position expressed in terms of line number of scanning line.

4. A system of claim 3 wherein each of said plurality of blocks includes a decoder connected to receive said document image digital data, a first latch connected to said decoder and said second counter and a second latch connected to said decoder, said second counter and said first counter, and said detecting means also includes an end identification circuit to which is connected each of said second plurality of detecting means and said second counter, said end identification circuit identifying the location of each end of a character line.

5. A system of claim 4 wherein said detecting means further includes a write control circuit connected to each of said plurality of blocks sections, to said first and second counters and to said means for storing, whereby said write control circuit supplies to said means for storing address information in association with each of the document image data to be stored.

6. A system of claim 5 wherein said correcting means includes a read control circuit connected between said determining means and said means for storing, said read control circuit changing the address in said second direction in accordance with the skew correction information supplied from said determining means independently of one block from another when the document image data stored in said means for storing are to be read therefrom.

7. A system of claim 1 wherein said amount of skew is determined by the following formula, $$T = (2q + W(Q) - (2r + W(R)))/(2(Q - R))$$

where
- q = line number of a scanning line having first appearing black pixels in block Q (i.e., line number of a first scanning line of a first character line in block Q);
- W(Q) = width of a character line (i.e., number of scanning lines) in block Q;
- r = line number of a first scanning line of a character line in block R;
- W(R) = width of a character line in block R;
- Q = block number of block Q; and
- R = block number of block R.

* * * * *